UNITED STATES PATENT OFFICE.

FRANCIS H. POUGH, OF NEW YORK, N. Y.

CEMENTING MATERIAL AND ITS MANUFACTURE.

No. 839,509.     Specification of Letters Patent.     Patented Dec. 25, 1906.

Application filed October 5, 1905. Serial No. 281,527.

*To all whom it may concern:*

Be it known that I, FRANCIS H. POUGH, a citizen of the United States, and a resident of the borough of Brooklyn, in the city and State of New York, have invented certain new and useful Improvements in Cementing Materials and Their Manufacture, of which the following is a specification.

This invention relates to cementing materials in which sulfur as a fusible binder is mixed or combined with an infusible body substance; and the invention consists in part in the peculiar cementing material as a product and in part in the mode of producing the said product.

In order that my invention may be the better understood, it will be proper to say that heretofore, so far as I am aware, the only mode of producing a cementing compound of sulfur with some infusible body substance has been to first melt the sulfur in a suitable vessel and then stir in the sand. This procedure has the defect that a homogeneous or uniform mixture of the two ingredients is practically impossible. The proportion of sulfur required is very excessive, and the tensile strength of the resulting cement is too low and is irregular.

The object of the present invention is in part to produce a mixture of the ingredients which may be, if desired, packed and shipped in a powdered form ready for melting without deteriorating in transit, also in part to reduce the portion of sulfur in the compound to a minimum, and also in part to provide such a cementing material which shall have the maximum of tensile strength.

In carrying out my invention I take sand, preferably of a fine sharp grade, wash it clean, and dry it. I then take sulfur or brimstone and reduce it to a fine granular condition, the granules corresponding substantially in dimensions to those of the sand. I then intimately and thoroughly mix together the sand and granulated sulfur in the desired proportions. This is preferably done in a rotary mixer. A good strong cement may be made in this way which contains less than sixty per cent., by weight, of sulfur. This dry granular cementing material may be packed in suitable receptacles and stored or shipped, as desired.

When to be used, the cementing material made as above described is put in a suitable vessel and melted, as in the case of a fusible metal.

By reason of my invention I am enabled to utilize unrefined sulfur in preparing it for mixture with the sand or infusible body substance. Any foreign matter which may be in the sulfur will be comminuted in the process of grinding the sulfur and will produce no bad results.

This cementing material when subjected to heat sufficient to fuse the sulfur becomes a semiliquid mass, and this mass while hot is poured into the cavity or crevice which is to be filled or the joint which is to be cemented.

It is important to the preparation of my cementing material that the sulfur shall be in a granular condition approximating in fineness the sand with which it is to be mixed and that the mixture of the substances shall be effected while they are in a dry granular condition, as this assures an intimate mixture, which is also a point of great importance. I have described sand as the substance to be used in combination with the sulfur, and I have found certain qualities of natural sand when properly dried and freed of moisture answer the purpose; but other inert infusible substances when reduced to the form of sand and dried will answer the same purpose as sand, and I do not wish to be understood as limiting myself to natural sand.

It will be observed that my invention does not comprehend the practice of reducing sulfur to a molten state and then thickening the fluid by the addition of various infusible ingredients, as such practice would not produce the results I accomplish.

No dry compound which can be readily transported composed of granulated sulfur and sand intimately mixed and always ready for use by the mere act of heating has heretofore been made, so far as I am aware.

Having thus described my invention, I claim—

1. A dry compound to be subjected to heat and used as a cementing material consisting of dry sand and sulfur, the latter in a granular form and the two granular substances intimately and thoroughly mixed together substantially as described.

2. A dry compound adapted to be subject ed to heat and used as a cementing element, consisting of sand and sulfur mixed intimately and thoroughly together the granules of the sulfur approximating the fineness and specific gravity of those of the sand.

3. A dry compound for the purpose specified composed of granulated unrefined sulfur ore intimately and thoroughly mixed with dried sand of the same granular consistency substantially as described.

FRANCIS H. POUGH.

Witnesses:
 GEO. T. C. LE BLANC,
 EDW. G. DELANEY.